US010888997B2

(12) United States Patent
Jung (10) Patent No.: US 10,888,997 B2
(45) Date of Patent: Jan. 12, 2021

(54) DEVICE FOR IMPLEMENTING ROBOT MOTIONS USING PROPULSIVE FORCE (71) Applicant: Seung Whan Jung, Seoul (KR)

(72) Inventor: Seung Whan Jung, Seoul (KR)

(*) Notice: Subject to any disclaimer, the term of this patent is extended or adjusted under 35 U.S.C. 154(b) by 0 days.

(21) Appl. No.: 16/755,847

(22) PCT Filed: Oct. 10, 2018

(86) PCT No.: PCT/KR2018/011907
§ 371 (c)(1),
(2) Date: Apr. 13, 2020

(87) PCT Pub. No.: WO2019/083196
PCT Pub. Date: May 2, 2019

(65) Prior Publication Data
US 2020/0376661 A1   Dec. 3, 2020

(30) Foreign Application Priority Data
Oct. 25, 2017  (KR) .................. 10-2017-0139085

(51) Int. Cl.
*B25J 9/00* (2006.01)
*B25J 19/00* (2006.01)
*B25J 9/16* (2006.01)

(52) U.S. Cl.
CPC ........... *B25J 9/1664* (2013.01); *B25J 9/0009* (2013.01); *B25J 19/0008* (2013.01)

(58) Field of Classification Search
CPC ................ B25J 9/16; B25J 9/00; B25J 19/00
See application file for complete search history.

(56) References Cited

U.S. PATENT DOCUMENTS

| 2003/0176946 A1* | 9/2003 | Maeda ................. B25J 19/0091 700/245 |
| 2007/0156283 A1* | 7/2007 | Takenaka ............. B62D 57/032 700/245 |
| 2018/0251199 A1* | 9/2018 | Radford ................. B25J 9/0087 |

FOREIGN PATENT DOCUMENTS

| JP | 2016049900 A | 4/2016 |
| JP | 2016523759 A | 8/2016 |
| KR | 101001291 B1 | 12/2010 |
| KR | 101151273 B1 | 6/2012 |
| KR | 1020160101809 A | 8/2016 |
| KR | 101742315 B1 | 5/2017 |

OTHER PUBLICATIONS

International Search Report of PCT/KR2018/011907, dated Feb. 12, 2019, English translation.
Office Action from Korean Intellectual Property Office of 10-2017-0139085, dated Nov. 26, 2018, English translation.

* cited by examiner

*Primary Examiner* — Kira Nguyen
(74) *Attorney, Agent, or Firm* — STIP Law Group, LLC (57) ABSTRACT The present invention relates to a device for implementing robot motions, and especially, a device for implementing robot motions using propulsive force, the device comprising: a thruster which is provided to a robot body and hauls the weight of a robot so that a posture for enabling the implementation of various motions may be easily induced, and which hauls the entire or some portion of the weight of the robot body by generating a propulsive force; and a posture control module which links the thruster and the robot body, thereby enabling the posture of the robot body to change.

9 Claims, 10 Drawing Sheets

DEVICE FOR IMPLEMENTING ROBOT MOTIONS USING PROPULSIVE FORCE

CROSS-REFERENCE TO RELATED APPLICATIONS

This application is the U.S. National Phase under 35 U.S.C. § 371 of International Application No. PCT/KR2018/011907 filed on Oct. 10, 2018, which in turn claims the benefit of Korean Application No. 10-2017-0139085, filed on Oct. 25, 2017, the disclosures of which are incorporated by reference into the present application.

TECHNICAL FIELD

The present invention relates to a device for implementing motions of a robot, and more particularly, to a device for implementing robot motions using propulsive force, whereby various motions are able to be implemented by hauling the weight of a robot and inducing posture.

BACKGROUND ART

In general, a robot is a machine for automatically processing certain works or operations using its own abilities. Robots have been developed mainly for industrial uses and used for part of factory automation or have been used to perform works instead of a human being in an extreme environment that is unbearable for humans. However, owing to the development of robotics, robots have been utilized in various fields including home and medical uses.

In such a robot, it is essential to control the posture for various motions to be implemented, and one of the important factors to consider in controlling the posture is the weight of the robot. In general, when the weight of the robot increases, more solidity and stronger torque is required. In order to control this, the number of components used is increased and the performance of the corresponding components needs to be excellent, hardware capable of high-level computation is required, and there are many limitations in constructing and designing the appearance of the robot.

Due to these many requirements and constraints, a heavier robot takes a great deal of time to perform any posture or motion, and thus agility and mobility are slowed. In addition, there is a problem in that the cost is increased and the types of components that can be used are limited because advanced components and the like need to be used in manufacturing the robot.

(Patent Document 1) KR 10-1151273 B 1 'Robot Having Balancing Function'

DISCLOSURE

Technical Problem

The present invention is directed to providing a device for implementing robot motions using propulsive force, whereby posture for implementing various motions is easily induced by hauling the weight of a robot.

Technical Solution

One aspect of the present invention provides a device for implementing robot motions using propulsive force, including: a thruster which is provided to a robot body and generates a propulsive force so as to haul the whole or partial weight of the robot body; and a posture control module which links the robot body with the thruster so as to change posture of the robot body.

Advantageous Effects

According to the present invention, the whole or partial weight of a robot body is hauled by propulsive force of a thruster so that the impacts on not only the entire robot body but also components of the robot body are decreased and thereby stable posture control of the robot body can be easily induced, and in particular, the posture can be easily controlled in such a way that the robot moving in contact with the ground can implement various motions.

Thus, agility and mobility of a robot is increased, and a wider radius of action is possible, and a robot capable of performing various motions can be manufactured.

In addition, wide selection of the components that constitute a robot is possible, and the number of the components can be reduced, and thus relatively inexpensive components can be used, which reduces the cost of manufacturing a robot and secures variety in constructing and designing the appearance of a robot.

DESCRIPTION OF DRAWINGS

FIG. 7A.

* Descriptions of main reference numerals in the drawings *

| A: safety air space | |
|---|---|
| 10: connecting member | 20: fixing member |
| 30: supporting member | |
| 100: robot body | 110: outer shell |
| 120: frame | 200: thruster |
| 300: posture control module | 310: first posture driver |
| 320: second posture driver | |
| 400: controller | |

BEST MODE OF THE INVENTION

The present invention suggests a device for implementing robot motions using propulsive force, whereby the weight of a robot is hauled so that posture for implementing various motions is easily induced, the device including a thruster, which is provided to a robot body and generates a propulsive force so as to tow the whole or partial weight of the robot body, and a posture control module which links the robot body with the thruster so as to change posture of the robot body.

The scope of the present invention is not limited to embodiments described below and may be variously modified and implemented by those skilled in the art without departing from the technical gist of the present invention.

Hereinafter, a device for implementing robot motions using propulsive force will be described in detail with reference to FIGS. 1 to 8 attached.

Figure 1:
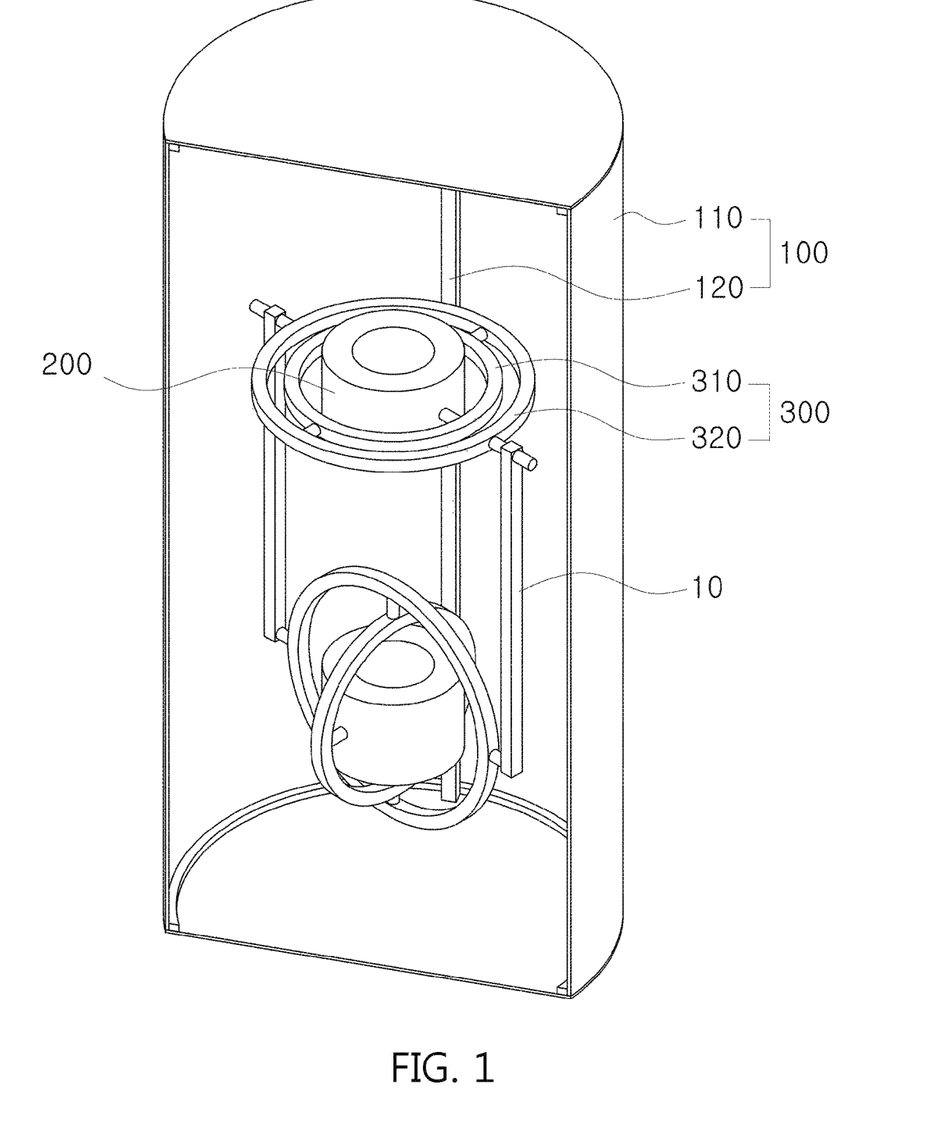
FIG. 1 is a cross-sectional view illustrating the structure of a device for implementing robot motions using propulsive force according to the present invention.

A device for implementing robot motions using propulsive force includes a thruster 200 that is provided to a robot body 100 and generates a propulsive force and a posture control module 300 that links the robot body 100 with the thruster 200 so as to change the posture of the robot body 100, as shown in FIG. 1.

Figure 2:
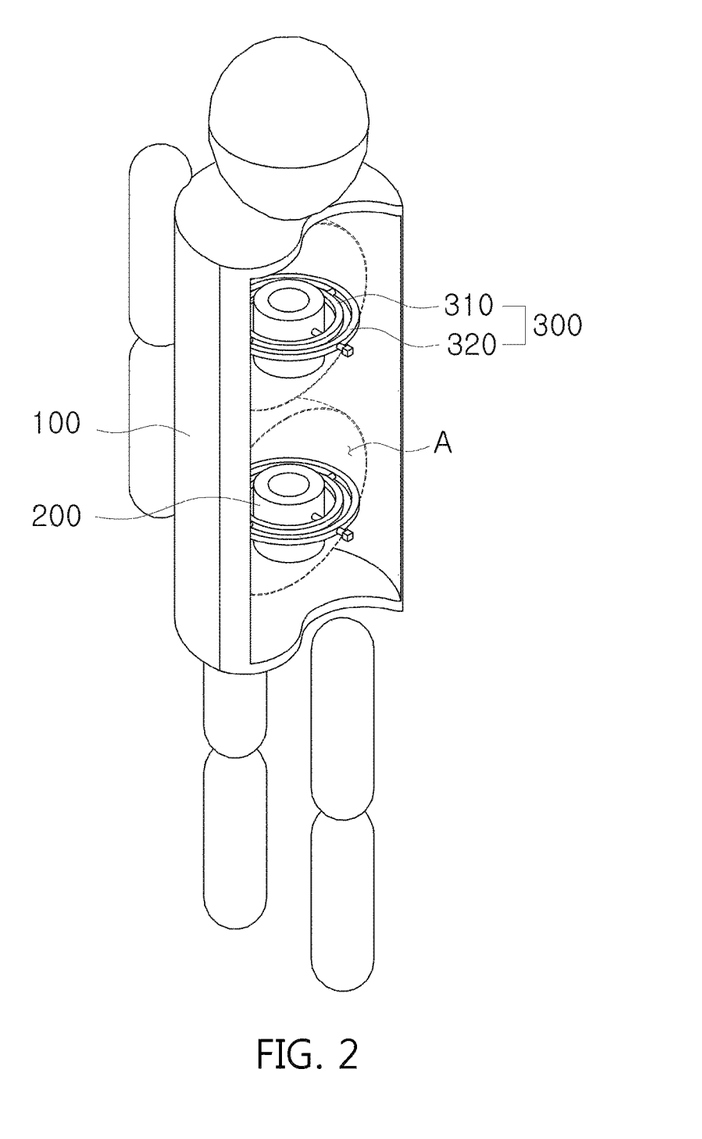
FIG. 2, FIG. 3, FIG. 4 and FIG. 5 are views illustrating examples in which a device for implementing robot motions using propulsive force according to the present invention is applied to a robot body and implements motions.
Figure 3:
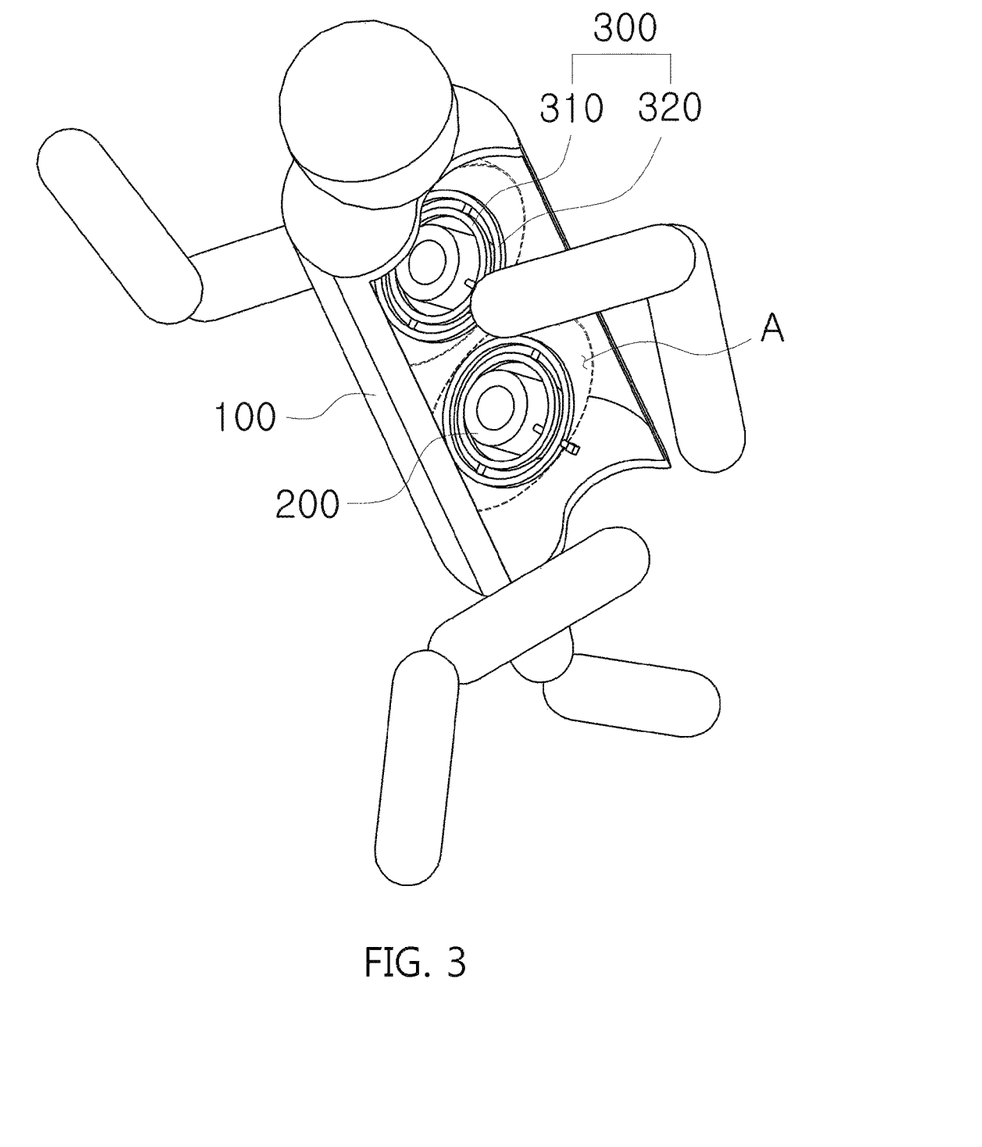
Figure 4:
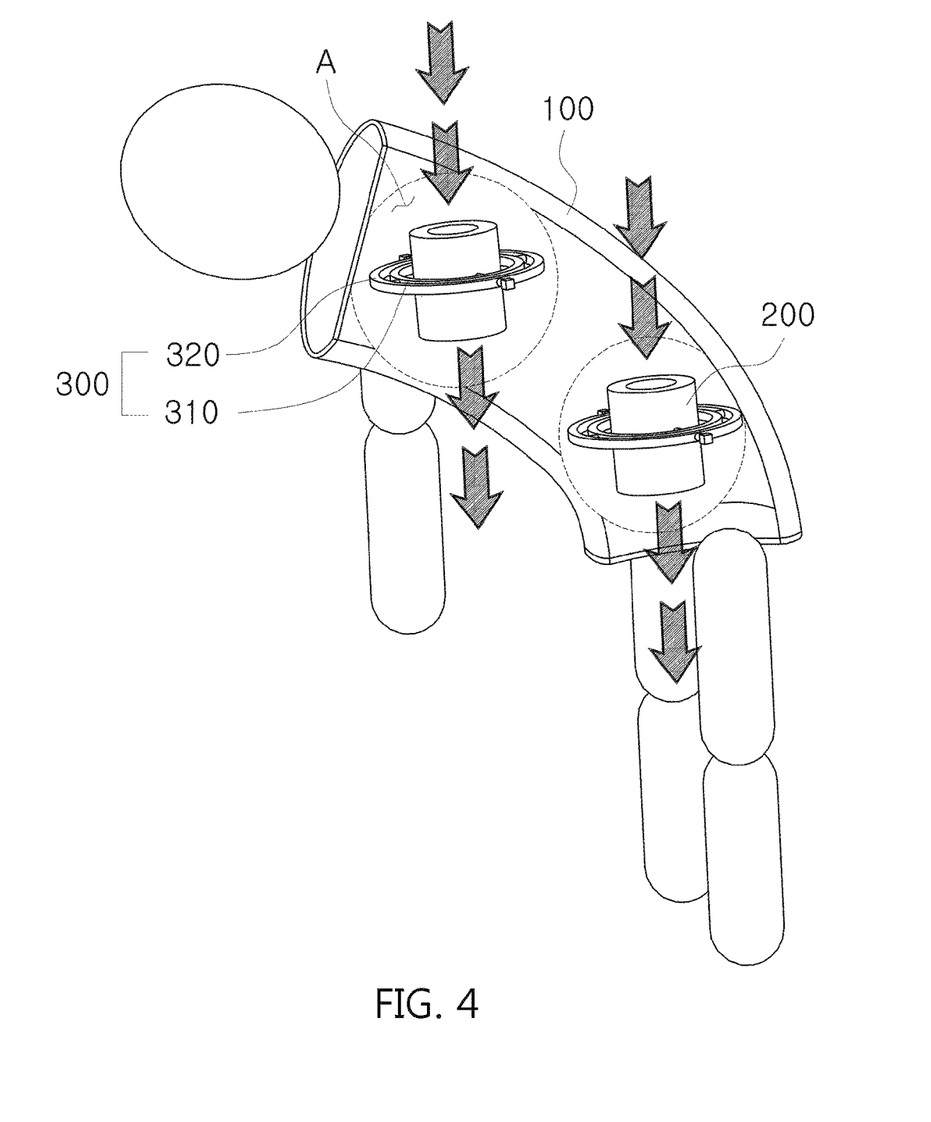
Figure 5:
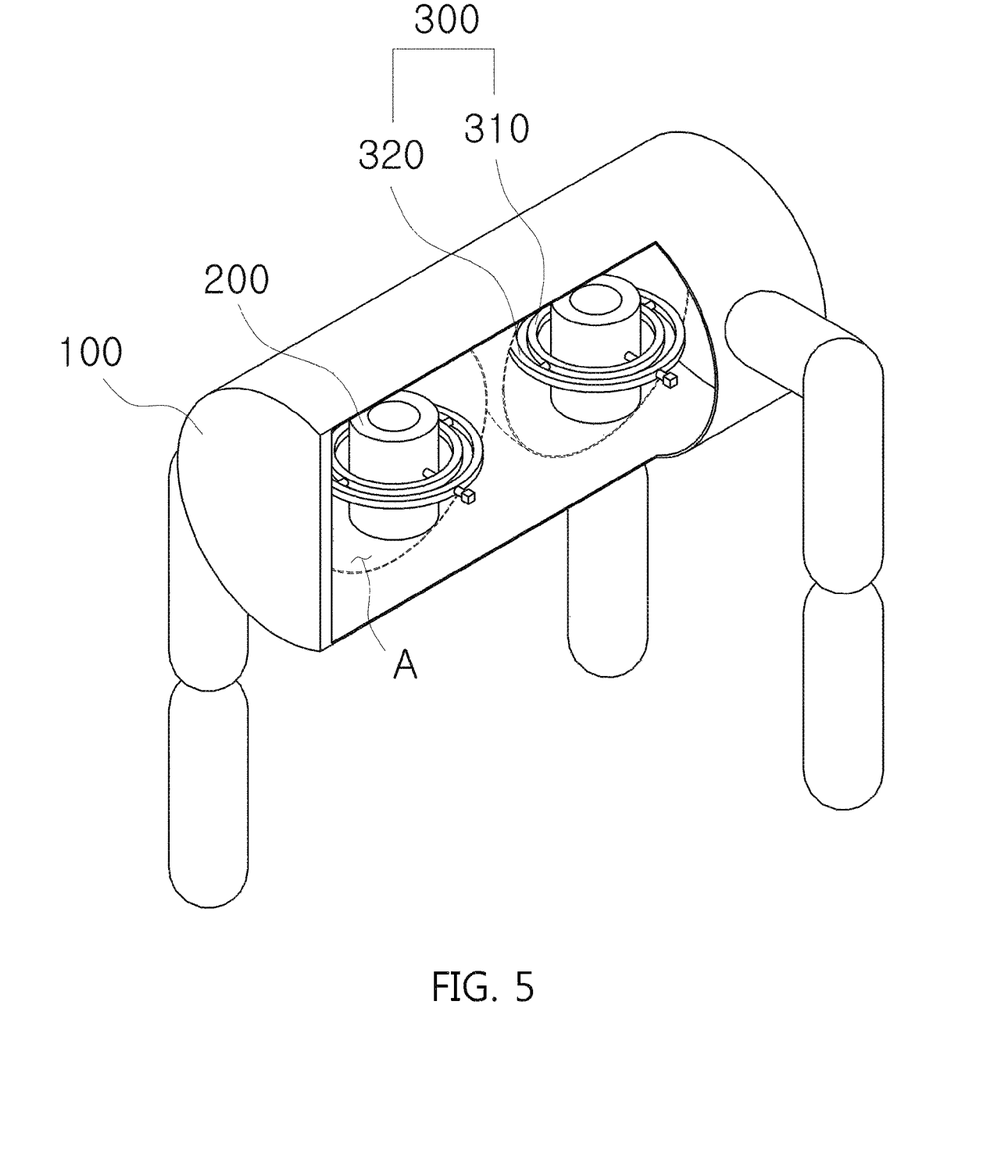

For example, the robot body 100 may be manufactured in various types including a two-leg walking type as shown in FIGS. 2 to 4, a four-leg walking type as shown in FIG. 5, a type corresponding to the body parts of a human being such as the arms or legs of the human being, a spherical type, a polygonal type and the like, and may also refer to the existing robot.

Also, the robot body 100 includes a frame 120 having a certain shape and an outer shell 110 coupled to the frame 120. However, the robot body 100 may also be formed only by either the frame 120 or the outer shell 110 when the robot body 100 can be supported only by either the frame 120 or the outer shell 110.

The frame 120 may have a shape of a flexible bar which is able to be bent according to a motion to be performed by the robot body 100, and may also have a link structure to be fold. Thus, the robot body 100 may pose naturally in order to implement various motions. Here, the term "posture" means a concept including the direction angle of a robot, i.e., pitch, roll and yaw.

Also, it is the objective of the present invention to facilitate posture control by reducing the weight of the robot body 100, and the frame 120 is preferably made of a lightweight material. Preferably, the frame 120 may be formed of a material having high gas permeability so as to prevent the propulsive force generated from the thruster 200 inside the frame 120 from being reduced by the frame 120, and it is desirable for the frame 120 form a predetermined shape of the robot body 100 with a minimum number of components.

Meanwhile, the outer shell 110 that forms the appearance of the robot may be coupled to the outside or the inside of the frame 120, may be coupled to the outside and the inside of the frame 120 so as to accommodate the frame 120 therein, or may be provided at a position where the outer shell 110 overlaps the frame 120 such that a part of the outer shell 110 is accommodated in and coupled to the frame 120.

Preferably, the outer shell 110 may be made of a lightweight material, like the frame 120, and more preferably, the outer shell 110 may be formed of a material having high gas permeability so as to prevent the propulsive force generated from the thruster 200 inside the outer shell 110 from being reduced by the outer shell 110. When gas permeability of the outer shell 110 is less than 50%, the propulsive force generated from the thruster 200 cannot properly work to haul the weight of the robot body 100 due to the outer shell 110. Here, preferably, the material having high gas permeability may refer to a material having 50% or higher gas permeability, and more preferably, the material having high gas permeability may refer to a material having 70 to 80% gas permeability.

Thus, the outer shell 110 may have a shape having a hole through which air passes or a shape of a mesh, like an iron net, but the present invention is not limited thereto. However, when a gap between the thruster 200 and the outer shell 110 is sufficient to prevent the propulsive force from being lowered, the outer shell 110 may also be made of a material having low gas permeability or no gas permeability. Also, considering the direction of the propulsive force due to change of direction of the thruster 200, the part of the outer shell 110 that may be affected by the propulsive force may be made of a material having gas permeability, and the part of the outer shell 110 that may not be affected by the propulsive force may be made of a material having no gas permeability.

When the frame 120 is formed to be bendable or foldable, it is desirable that the outer shell 100 is formed of a flexible material so as to realize natural motions of the robot body 100.

The thruster 200 according to the present invention is provided to the robot body 100, generates the propulsive force and hauls the whole or partial weight of the robot body 100, as described above. Here, the thruster 200 means a thing producing propulsive force using any kind of fuels or electricity. And, hauling means that the robot body 100 is spaced a certain height from the ground and also generates propulsive force in a direction that reduces the weight of the robot body 100 on the ground or in a posture while the robot body 100 does not fall off the ground. In this way, according to the present invention, the whole or partial weight of the robot body 100 is hauled using the propulsive force of the thruster 200, and thus, the effect on the whole of the robot body 100 and the components of the robot body 100 is reduced.

Thus, wide selection of the components that constitute a robot is possible, and the number of the components may be reduced, and thus relatively inexpensive components may be used, which reduces the cost of manufacturing a robot and secures variety in constructing and designing the appearance of a robot.

Also, even in an environment, such as sand or the like, in which a bearing power is weak and movement is not easy, by hauling the weight of a robot through the generation of propulsive force, it is possible to obtain an effect that smooth movement of a robot can be realized.

The thruster 200 may be provided inside the robot body 100, as shown in the drawings, and may also be provided outside the robot body 100. Also, preferably, the maximum value of propulsive force to be generated by the thruster 200 may be greater than or equal to a value of propulsive force required to haul the weight of the robot body 100 and control the posture. This is to perform posture control for a particular motion to be implemented by increasing the propulsive force and consider the loss of propulsive force due to external factors. Also, the thruster 200 may generate the propulsive force not only constantly but also temporarily when a robot takes a certain motion. Furthermore, the thruster 200 may generate only the propulsive force, but may change the direction of generating the propulsive force with generation of the propulsive force.

Meanwhile, the posture control module 300 may link the thruster 200 with the robot body 100 so as to change the posture of the robot body 100 and may be located outside the robot body 100 but preferably may be provided inside the robot body 100 together with the thruster 200 so as to be protected from the external factors and for smooth interaction with the thruster 200.

As described above, when the thruster 200 generates only the propulsive force, the posture control module 300 may change the posture of the robot body 100 and simultaneously control the direction of the thruster 200 so as to set the direction of the propulsive force. When the thruster 200 may change the direction with generation of the propulsive force and the thruster 200 may set the direction of the propulsive force by itself, the posture control module 300 may serve to change and balance the posture of the robot body 100 according to the direction change of the thruster 200.

The posture control module 300 may surround the whole of the thruster 200, as shown in FIG. 1, and may also surround a part of the thruster 200. In the drawings, the posture control module 300 has an annular shape but may have any shape such as a polygonal shape or the like. Also, the posture control module 300 may have a shape of a rotary shaft to be rotated with respect to the robot body 100. The posture control module 300 having the shape of the rotary shaft may rotate the thruster 200 about at least one of the x-axis, the y-axis, and the z-axis.

Because the posture control module 300 controls the direction of the thruster 200 and/or the robot body 100, although not shown in the drawings, the posture control module 300 includes a driving unit such as a motor for providing a rotational force. Also, when the posture control module 300 controls the direction, the posture control module 300 may not only control the direction about one of the x-axis, the y-axis, and the z-axis but may also control the direction about two axes such as the x-axis and the y-axis, the x-axis and the z-axis, or the y-axis, and the z-axis or control the direction about all of the x-axis, the y-axis, and the z-axis. In this way, the configuration of the posture control module 300 may be changed according to the number of axes for controlling the direction, and this is determined in consideration of the use of the robot. Only, the configuration of the posture control module 300 for controlling the direction about three axes (the x-axis, the y-axis, and the z-axis) will be described below, but the present invention is not limited thereto.

The posture control module 300 for controlling the direction about the three axes includes a first posture driver 310 that surrounds the thruster 200 and a second posture driver 320 that surrounds the first posture driver 310, as shown in FIG. 1.

More specifically, the thruster 200 is coupled to the first posture driver 310 such that the thruster 200 is rotatable about a first axis, and the first posture driver 310 is coupled to the second posture driver 320 such that the first posture driver 310 is rotatable about a second axis that forms a right angle with respect to the first axis. Also, the second posture driver 320 is coupled to the robot body 100 to be rotatable about a third axis that forms a right angle with respect to the first axis and the second axis.

Thus, when the posture for motions to be implemented by the robot body 100 is induced, the first posture driver 310 and the second posture driver 320 as well as the thruster 200 are rotated in consideration of the direction in which propulsive force needs to be generated by the thruster 200, and when the propulsive force is generated, the robot body 100 is balanced and deformed.

According to the present invention, the whole or partial weight of the robot body 100 is hauled by the propulsive force of the thruster 200 so that stable posture control of the robot body 100 can be easily induced through the posture control module 300. In particular, the moving robot coming in contact with the ground may control the posture easily so as to implement various motions. Thus, agility and mobility of the robot is increased, a wide radius of action is possible, and the robot capable of performing various motions may be manufactured.

Meanwhile, the robot body 100 may include at least two thrusters 200 and at least two posture control modules 300, as shown in FIGS. 1 to 6. The number of the thrusters 200 and the posture control modules 300 is determined in consideration of the use of the robot and motions to be implemented by the robot. Also, as shown in the drawings, the posture control module 300 may be provided to correspond to each thruster 200, but one posture control module 300 may also be provided for a plurality of thrusters 200.

Figure 6:
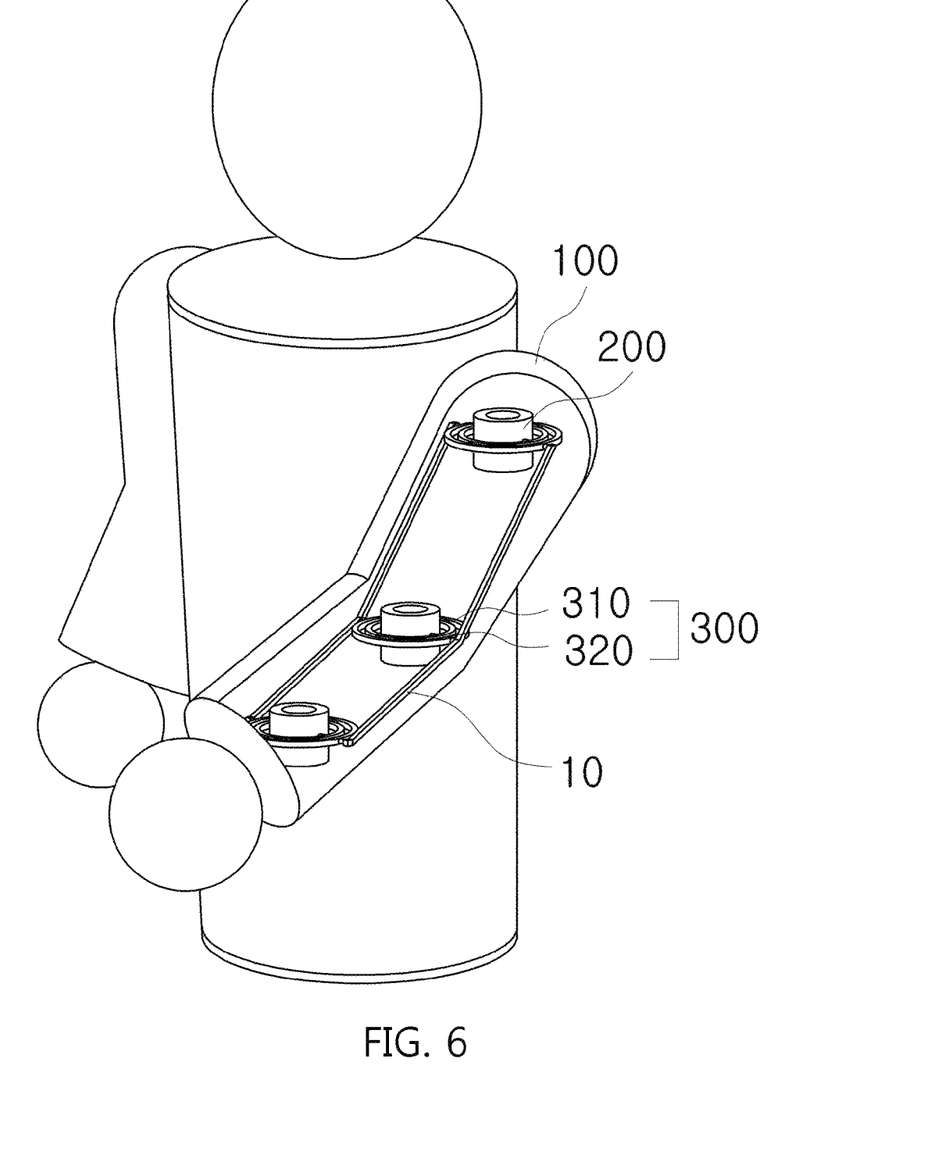
FIG. 6 is a view illustrating an example in which a device for implementing robot motions using propulsive force according to the present invention is applied to an arm of a robot and implements motions.

When a plurality of thrusters 200 and a plurality of posture control modules 300 are provided, as shown in FIGS. 2 to 5, they may be operated without any interactions therewith, and as shown in FIGS. 1 and 6, each posture control module 300 may be interconnected by a connecting member 10. In this case, each of the posture control modules 300 connected by the connecting member 10 has at least one rotary shaft coupled to the robot body 100.

The connecting member 10 has one of various shapes and directly or indirectly connects the rotary shafts of the posture control modules 300, and in an example, the rotary shaft of each posture control module 300 may be connected by the connecting member 10 formed in a bar shape, as shown in FIGS. 1 and 6. Due to the connecting member 10, positions of the thrusters 200 and the posture control modules 300 may be limited, and when a plurality of thrusters 200 and a plurality of posture control modules 300 are provided, the robot body 100 is guided to take a more natural posture. Furthermore, the connecting member 10 constrains the thrusters 200 mutually, and thus, even when excessive propulsive force is generated in one thruster 200, the one thruster 200 may be prevented from deviating from a normal operation range by the connecting member 10 directly/indirectly connected to another thruster 200.

Meanwhile, as shown in FIGS. 2 to 5, a space where the thruster 200 and the posture control module 300 are working, is referred to as a safety air space A, and preferably, there is no component in the safety air space A not to interfere with driving of the thruster 200 and the posture control module 300. However, when any component needs to be inevitably installed in the safety air space A, it is desirable that the component may be installed at a position where interference with driving of the thruster 200 and the posture control module 300 is minimized. Also, when there is no effect on driving of the thruster 200 and the posture control module 300 or the effect may be minimized, any object may enter and exit the safety air space A.

In an example to which the device for implementing robot motions according to the present invention described above is applied, the robot body 100 may constitute the upper body of the robot in which the robot body 100 is capable of two-leg walking, as shown in FIGS. 2 and 4, and two thrusters 200 and two posture control modules 300 may be provided in the robot body 100 that constitutes the upper body of the robot.

First, when the robot is kept in a standing state, as shown in FIG. 2, the thruster 200 and the posture control module 300 are controlled so that the propulsive force generated from the thruster 200 is formed in a downward direction. In this case, all of the two thrusters 200 may generate the propulsive force, or the propulsive force may be generated by one of the two thrusters 200. Also, the propulsive force of the thruster 200 is increased in the robot-standing state so that the whole of the robot is spaced apart from the ground and thus the robot may perform a jumping motion.

When the robot moves in a forward direction as shown in FIG. 3, the thruster 200 and the posture control module 300 are controlled so that the robot body 100 is inclined forward and the propulsive force generated from the thruster 200 is formed in an intermediate direction between backward and downward directions. In this case, all of the two thrusters 200 and the two posture control modules 300 are controlled so that the propulsive force is formed in the intermediate direction between the backward and downward directions, or one thruster 200 and one posture control module 300 may also be controlled so that its propulsive force is formed in the backward direction and the other thruster 200 and the other posture control module 300 may also be controlled so that its propulsive force is formed in the downward direction.

When the robot takes a greeting motion as shown in FIG. 4, first, the propulsive force of the thruster 200 at an upper side of the robot body 100 is lowered as compared to the propulsive force of the thruster 200 at a lower side of the robot body 100 so that the robot bows its upper body and then the propulsive force is increased again so that the robot is kept in a standing state. In this case, the posture control module 300 controls so that the direction of the propulsive force is constantly maintained or gradually changed according to the motion of the robot body 100.

Meanwhile, in another example to which the device for implementing robot motions according to the present invention is applied, the robot body 100 may constitute the body of the robot capable of four-leg walking as shown in FIG. 5, and two thrusters 200 and two posture control modules 300 may be provided in the robot body 100 that constitutes the body of the robot. Thus, the robot may jump or move through control of the thruster 200 and the posture control module 300, and various motions, e.g. some legs of the robot are spaced apart from the ground, may be implemented.

In another example to which the device for implementing robot motions according to the present invention is applied, the robot body 100 may be configured to play a role of part of the body such as the arms or legs, feet and the like of the human being, as shown in FIGS. 6 and 7A to 7C.

First, as shown in FIG. 6, the robot body 100 may be configured to play a role of the arms of the human being, and in this case, the thruster 200 may be provided in at least one of parts that constitute the shoulder, the elbow and the wrist corresponding to the joint parts of the arm. When the thrusters 200 are provided in at least two of the shoulder, the elbow, and the wrist, preferably, a natural motion may be implemented by using the connecting member 10.

Also, although not shown in the drawings, the robot body 100 may play a role of the legs of the human being, and in this case, the thruster 200 may be provided in at least one of parts that constitute the coxa, the knee and the ankle corresponding to the joint parts of the leg. When the thrusters 200 are provided in at least two of the coxa, the knee and the ankle, preferably, a natural motion may be implemented by using the connecting member 10.

Meanwhile, when the robot body 100 plays a role of the joint part such as the arms and the legs of the human being, the shape of the joint may be provided in various well-known joint shapes, and for example, when the robot body 100 includes joints having a shape applied to the "Slave" robot of Carl Pisaturo, the degree of freedom of a layout of a motor is increased, and thus, this may be more advantageous in designing the center of gravity of the robot to which the device for implementing robot motions using the propulsive force according to the present invention is applied.

Figure 7A:
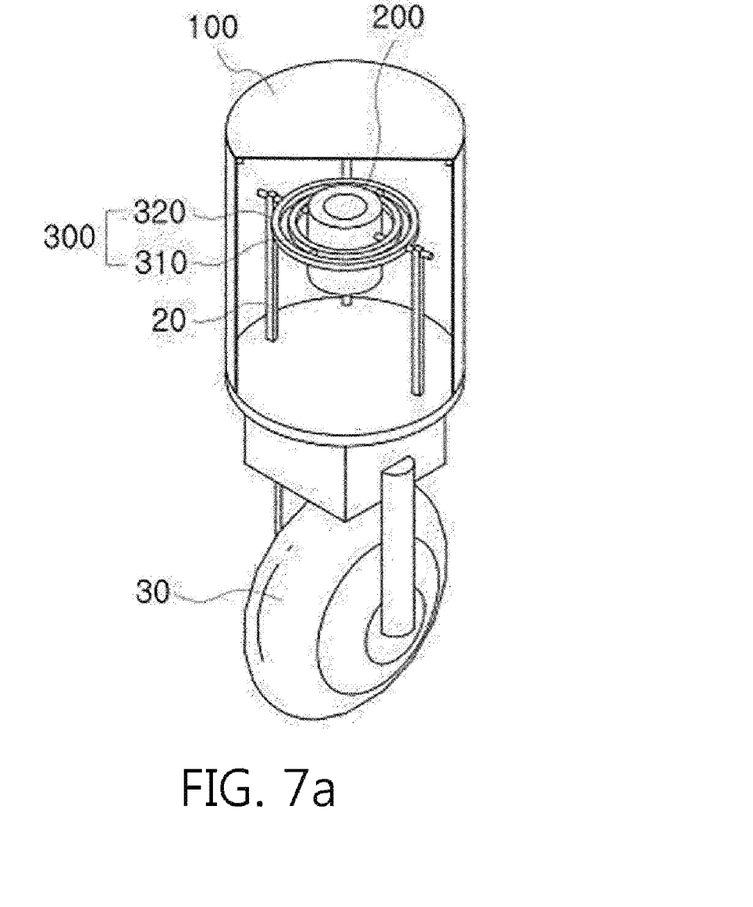
Figure 7B:
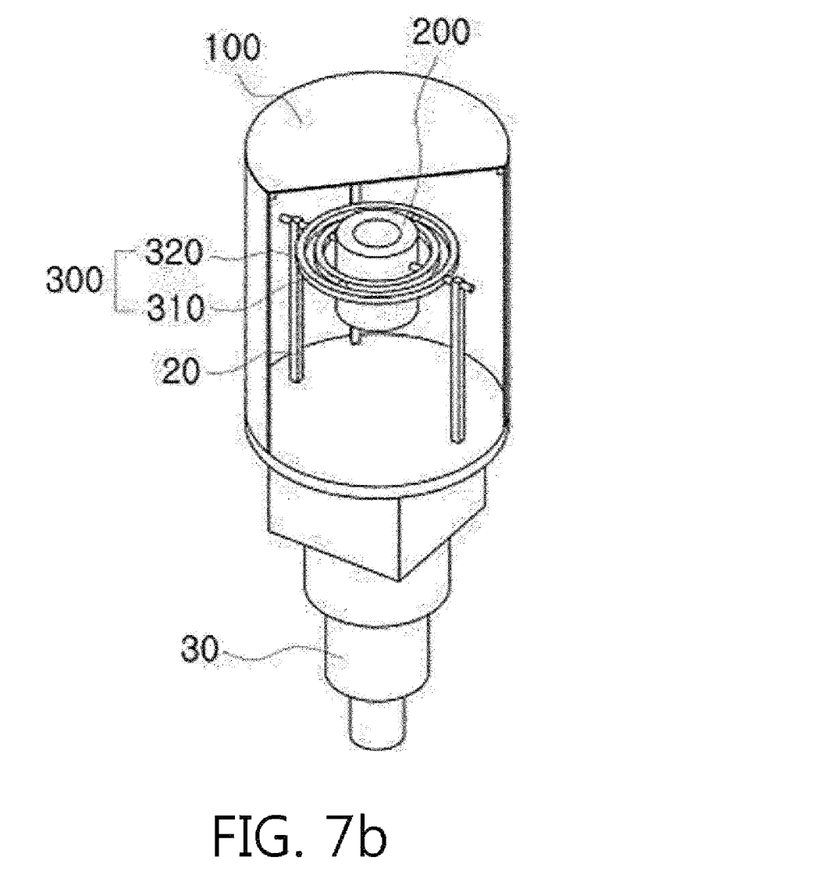
FIG. 7B and FIG. 7C are views illustrating examples in which a device for implementing robot motions using propulsive force according to the present invention is supported in various forms.
Figure 7C:
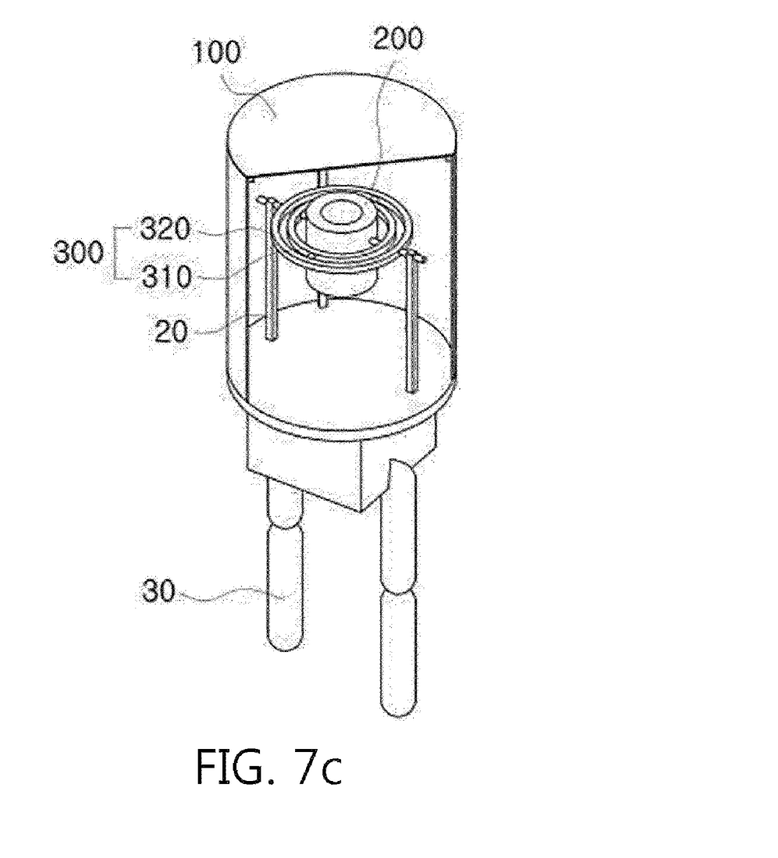

Also, as shown in FIGS. 7A to 7C, the robot body 100 may play a role of the feet of the human being, and in this case, a supporting member 30 having one of various shapes may be formed under the robot body 100 so as to perform a suitable motion for the use of the robot. Also, the device for implementing robot motions according to the present invention may further include a fixing member 20 for connecting the rotary shaft of the posture control module 300 to a bottom surface of the robot body 100 so as to prevent wobbling of the thruster 200 and the posture control module 300 that are located close to the ground.

Figure 8:
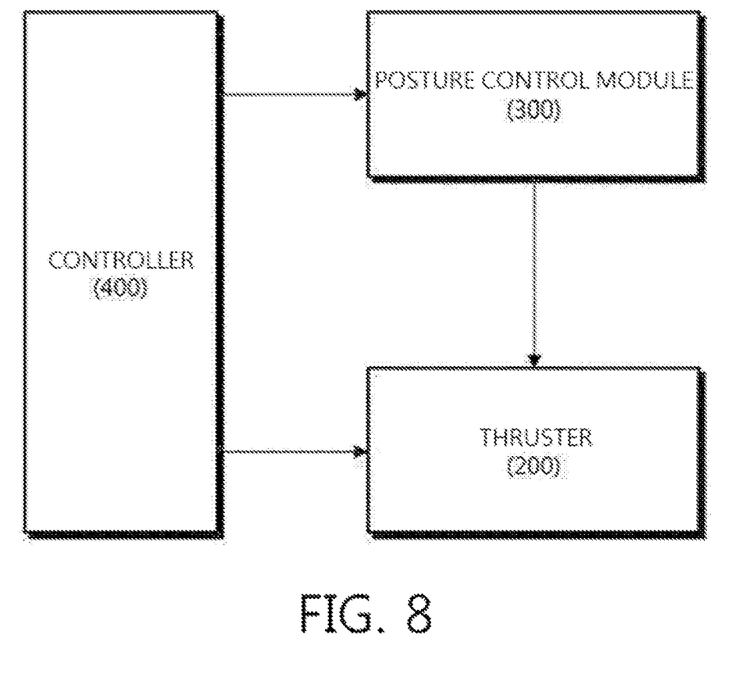
FIG. 8 is a schematic block diagram of a device for implementing robot motions according to an embodiment.

FIG. 8 is a schematic block diagram of a device for implementing robot motions according to an embodiment. As shown in FIG. 8, the device for implementing robot motions according to the embodiment may include a thruster 200, a posture control module 300 and a controller 400. The thruster 200 and the posture control module 300 themselves are the same as described above. The controller 400 is configured to perform overall control of the robot body 100. In an embodiment, the controller 400 controls the direction of the propulsive force of the thruster 200 through control of driving the posture control module 300. To do this, an additional driving unit may be further provided, and the driving unit may be a brushless direct current (BLDC) motor, a wire-pulley device, a stepping motor, or the like. Also, the controller 400 may control activation of the thruster 200 so that the propulsive force may be generated by rotation of a propeller or reaction of a jet gas. In an embodiment, the controller 400 controls to activate the thruster 200 only when the robot performs a specific motion. The specific motion is predefined, and jumping or running may be an example thereof.

The invention claimed is:

1. A robot comprising:
   a robot body (100) having a predetermined shape formed through a frame (120);
   thrusters (200) each of which is located inside the robot body (100) and generates a propulsive force so as to haul the whole or partial weight of the robot body (100);
   posture control modules (300) each of which is located between the robot body (100) and the thruster (200) and rotates the robot body (100) with respect to the thruster (200); and
   a controller (400) which controls the thruster (200) and the posture control module (300),
   wherein the robot body (100) comprises at least two thrusters (200) and the posture control modules (300) each corresponding to one of the thrusters (200), and the frame (120) is formed to be deformable, and
   the controller (400) controls the operation of each of the posture control modules (300) while maintaining a direction of the propulsive force of each of the thrusters (200), so that the robot body (100) is rotated with respect to each of the thrusters (200) by the corresponding posture control module (300), and thus the frame (120) is deformed and the posture of the robot is changed.

2. The robot of claim 1, wherein the posture control module (300) rotates the robot body (100) with respect to the thruster (200) about at least one of an x-axis, a y-axis, and a z-axis.

3. The robot of claim 2, wherein the posture control module (300) comprises:
   a first posture driver (310) which surrounds the thruster (200) and is coupled to the thruster (200) such that the thruster (200) is rotatable about a first axis; and
   a second posture driver (320), which surrounds the first posture driver (310), is coupled to the first posture driver (310) such that the first posture driver (310) is rotatable about a second axis that forms a right angle with respect to the first axis, and is coupled to the robot body (100) to be rotatable about a third axis that forms a right angle with respect to the first axis and the second axis.

4. The robot of claim 1, wherein
the posture control modules (300) are connected to each other by a connecting member (10).

5. The robot of claim 1, wherein
the frame (120) is formed to be bendable or foldable.

6. The robot of claim 1, wherein the robot body (100) comprises the outer shell (110) that forms an appearance of a robot.

7. The robot of claim 6, wherein the outer shell (110) is formed of a material having 50% or higher gas permeability.

8. The robot of claim 6, wherein the outer shell (110) is formed of a flexible material.

9. The robot of claim 1, wherein the robot body (100) is provided with a supporting member (30) formed under the robot body (100), which supports the robot body (100) and is involved in movement of the robot body (100).

* * * * *